United States Patent [19]
Suzuki et al.

[11] Patent Number: 5,947,558
[45] Date of Patent: Sep. 7, 1999

[54] LUMBAR SUPPORT DEVICE

[75] Inventors: Seiji Suzuki; Hidetoshi Nakane, both of Toyota; Fumio Wakamatsu, Okazaki, all of Japan

[73] Assignee: Aisin Seiki Kabushiki Kaisha, Kariya, Japan

[21] Appl. No.: 09/103,567

[22] Filed: Jun. 24, 1998

[30] Foreign Application Priority Data

Jun. 19, 1997 [JP] Japan ..................................... 9-172495

[51] Int. Cl.$^6$ ..................................................... A47C 3/025
[52] U.S. Cl. ..................................... 297/284.4; 297/284.7; 297/284.8
[58] Field of Search ............................. 297/284.4, 284.1, 297/284.8, 284.7, 452.3, 452.31, 452.32

[56] References Cited

U.S. PATENT DOCUMENTS

| | | |
|---|---|---|
| 4,957,102 | 9/1990 | Tan et al. . |
| 5,088,790 | 2/1992 | Wainwright et al. . |
| 5,423,593 | 6/1995 | Nagashima . |
| 5,553,919 | 9/1996 | Dennis . |

FOREIGN PATENT DOCUMENTS

| | | |
|---|---|---|
| 1809826 | 7/1969 | Germany . |
| 1-30121 | 9/1989 | Japan . |
| 943124 | 11/1963 | United Kingdom . |

*Primary Examiner*—Milton Nelson, Jr.
*Attorney, Agent, or Firm*—Burns, Doane, Swecker & Mathis, LLP

[57] ABSTRACT

A lumbar support device includes a first drive device fixed to a stationary bracket member to move a lumbar pad upward and downward of a seat back, and a second drive device secured on a movable member which is one member of a link mechanism.

7 Claims, 6 Drawing Sheets

LUMBAR SUPPORT DEVICE

BACKGROUND OF THE INVENTION

The present invention relates to a lumbar support device mounted in a seat back of a vehicle seat.

A lumbar support device in a vehicle seat back is used for adjusting the firmness of the seat back in order to reduce the fatigue of an occupant or seated person who sits on the seat of a vehicle for a long time. To this end, the lumbar support device is usually provided with a support or lumbar plate which can be moved in a horizontal direction and a vertical direction by operating a lever connected thereto to align it with the lumbar region of the occupant of the seat.

The lumbar support device of this kind is known in a prior art, as disclosed in the Examined Japanese Utility Model Publication No. 1-30121(1989). This lumbar support device includes a crank rod turnably supported on a seat back frame and a support member slidably supported on the crank rod.

In this device of the prior art, the support member is moved forward and backward of the seat back to adjust a degree of pressure or hardness for supporting the lumbar region of a seated person, by activating the crank rod by a first drive mechanism, which is supported on the seat back frame, that is, by turning the crank rod with respect to the seat back frame. The support member is moved upward and downward of the seat back to adjust the position for supporting the lumbar region of the seated person, by activating a second drive mechanism, which is also supported on the seat back frame, that is, by sliding the support member with respect to the crank rod.

In the aforementioned device of the prior art, however, the first drive mechanism and the second drive mechanism for moving the support member longitudinally and vertically of the seat back are supported by the seat back frame. In order that the turns of the crank rod may not be obstructed by the second drive mechanism, therefore, there has to be set a play mechanism between the second drive mechanism and the seat back frame. This play mechanism may increase the number of parts to complicate the structure and to increase the chattering of the support member.

SUMMARY OF THE INVENTION

It is, therefore, an object of the invention to make the support member movable vertically and longitudinally of the seat back not by employing the lay mechanism but with a simple structure.

In order to achieve the above-specified object, according to the invention, there is provided a lumbar support device comprising movable members so supported on a seat back frame through a four-link mechanism as to move upward and downward of a seat back; and a support member so supported on the movable members through a crank rod mechanism as to move forward and backward of the seat back.

According to this technical means, the support member is moved upward and downward of the seat back by activating the four-link mechanism to move the movable members, and the support member is moved forward and backward of the seat back with respect to the movable members by activating the crank rod mechanism. Thus, the movable members are moved together with the crank rod mechanism, when the four-link mechanism is activated, but are left inactive when the crank rod mechanism is active. As a result, the support member can be moved vertically and longitudinally of the seat back with the simple structure but without employing any play mechanism.

Preferably, the lumbar support device may further comprise: a first drive mechanism supported on the movable members for turning the crank rod mechanism with respect to the movable members; and a second drive mechanism supported on the seat back frame for activating the four-link mechanism.

According to the invention, the support member is so supported through the crank rod mechanism on the movable members, which are supported to move upward and backward of the seat back through the four-link mechanism, that they may move forward and backward of the seat back. As a result, the movable members are moved together with the crank rod mechanism, when the four-link mechanism is active, but is inactivated when the crank rod mechanism is active. This makes it possible to eliminate the play mechanism which has been indispensable in the prior art, thereby to eliminate the chattering, as might otherwise be caused by the play mechanism, of the support member in the upward and downward directions of the seat back. Moreover, the crank rod mechanism is supported on and united with the movable member so that the number of parts can be remarkably reduced. Thus, it is possible to provide a lumbar support device which is advantageous not only in the assemblability but also in the cost.

DESCRIPTION OF THE PREFERRED EMBODIMENT

Figure 1:
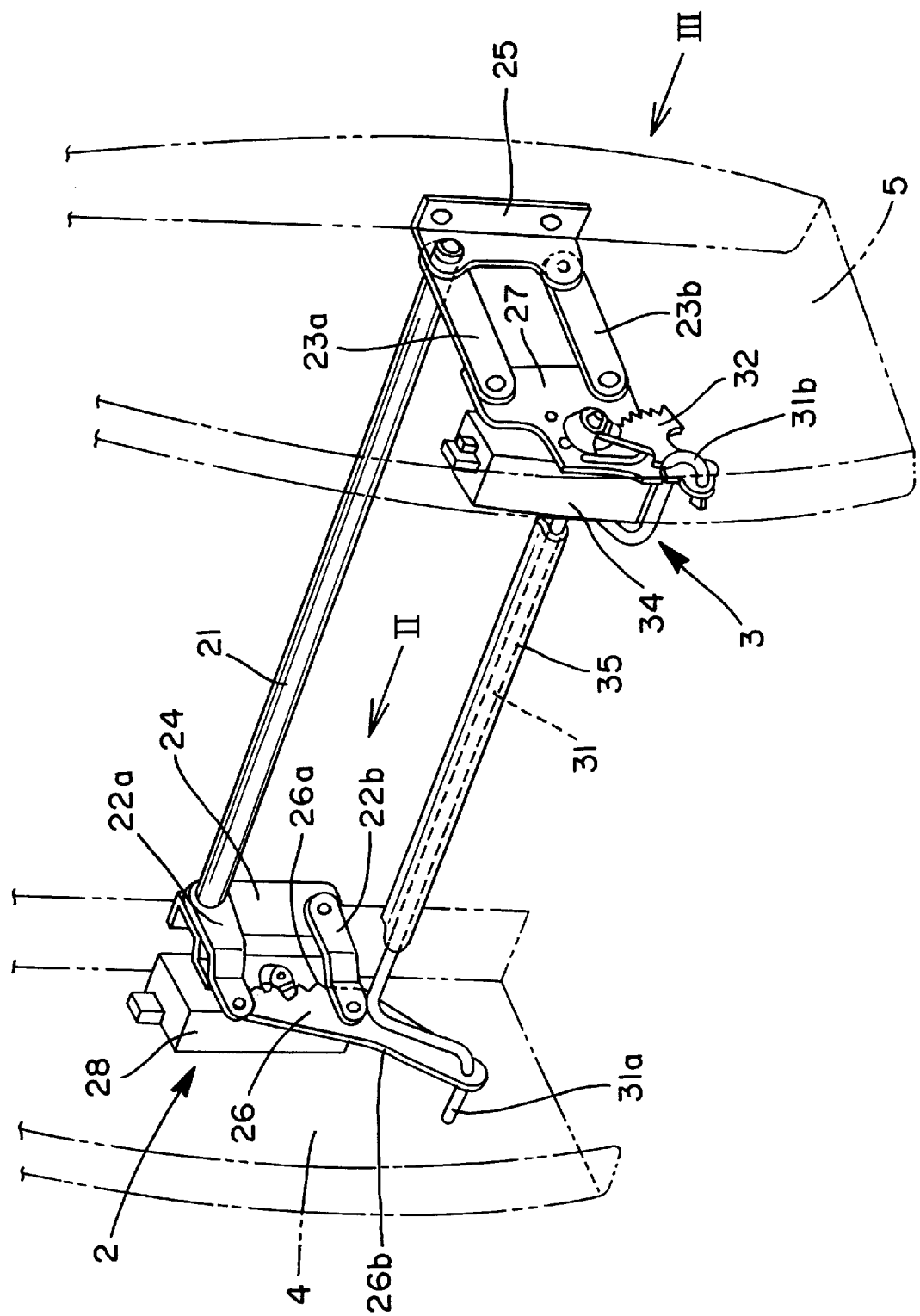
FIG. 1 is a perspective view of a lumbar support device according to the present invention.
Figure 2:
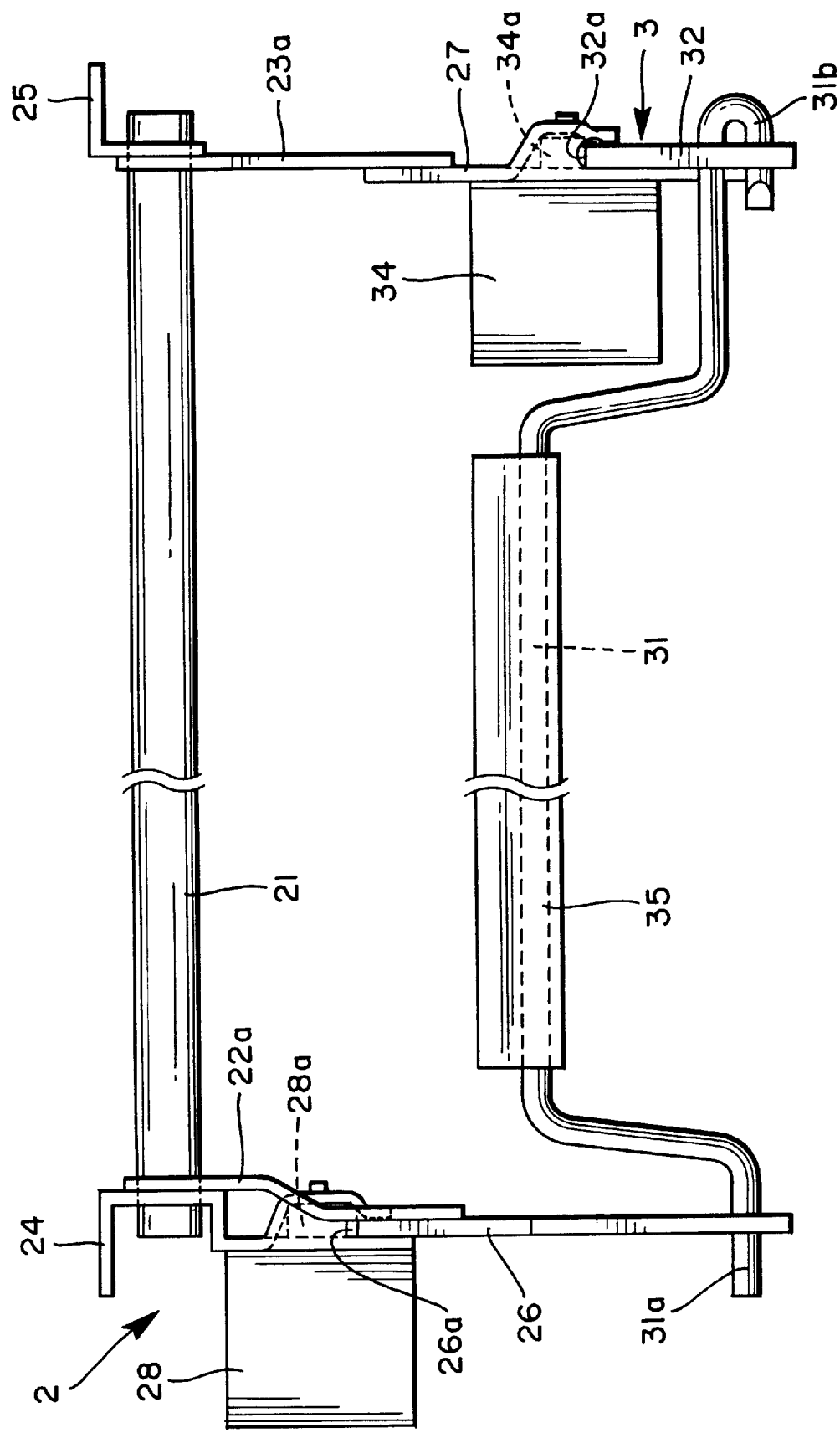
FIG. 2 is a top plan view of FIG. 1.
Figure 3:
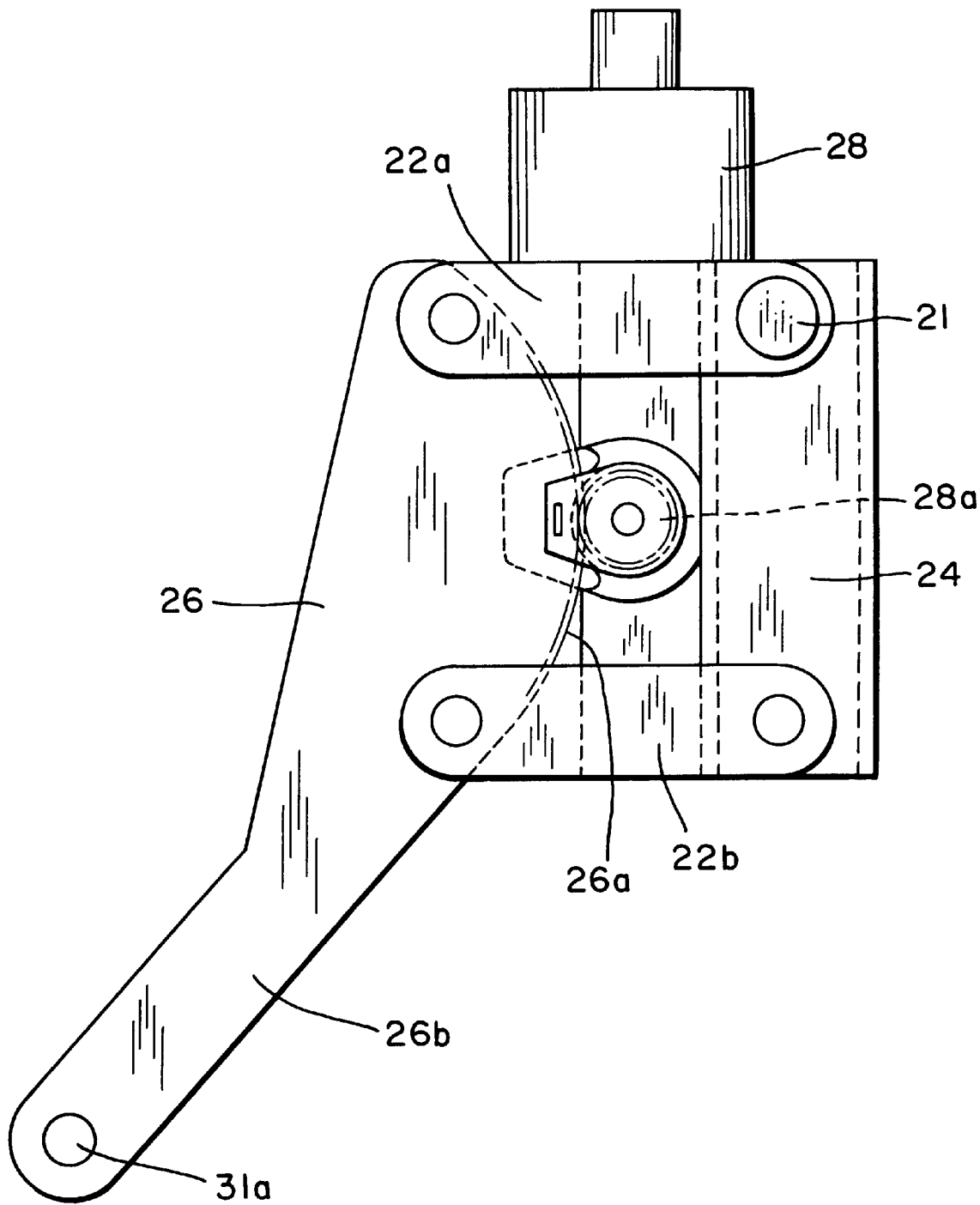
FIG. 3 is a view taken along an arrow II of FIG. 2.
Figure 4:
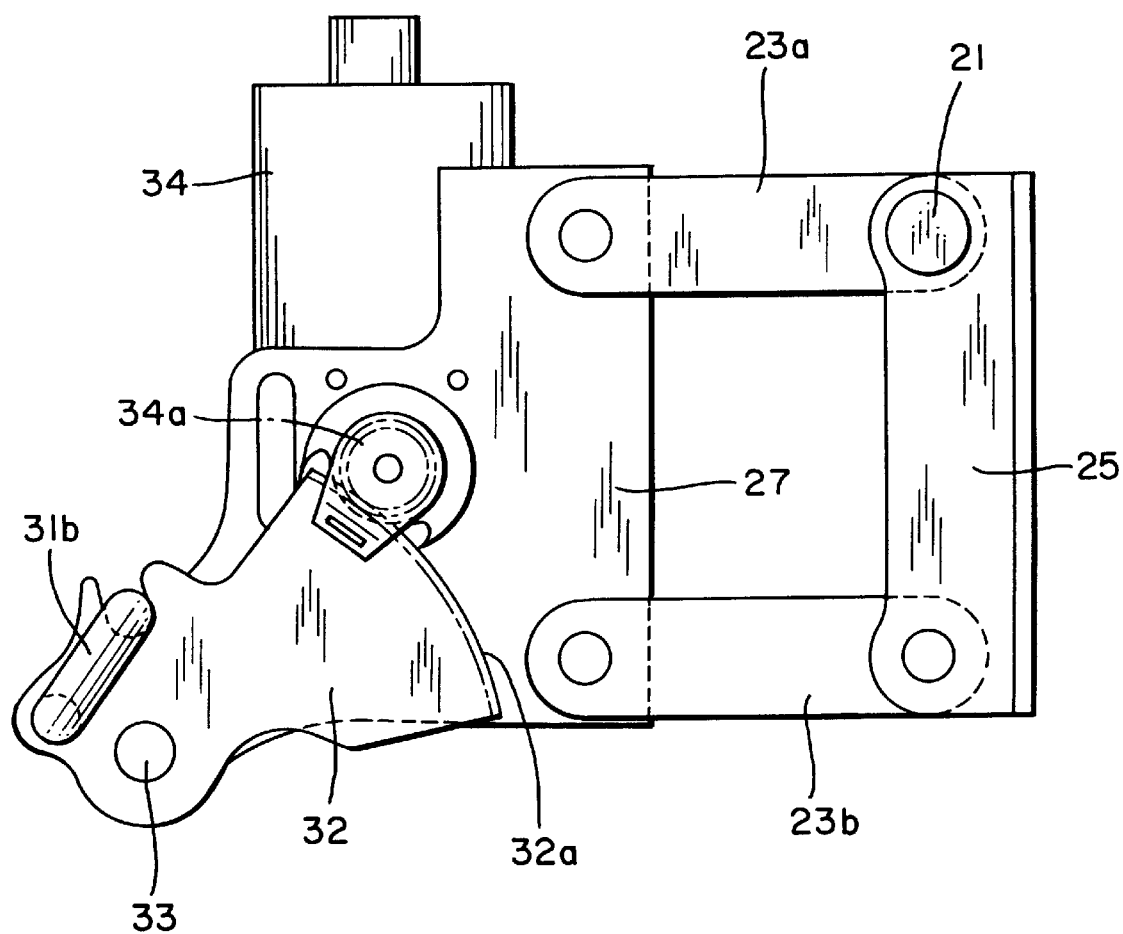
FIG. 4 is a view taken along an arrow III of FIG. 2.

Refer to in FIG. 1, a lumbar support device which is used for supporting the lumbar region of a seated person is arranged in a seat back (not shown) and is supported by a pair of opposed seat back side frames 4 and 5 which are arranged in parallel at two side portions of the seat back. The lumbar support device includes a stationary bracket 24 secured to the side frame 4 and a stationary bracket 25 secured to the other side frame 5. The lumbar support device also includes a vertical adjusting mechanism 2 attached to the bracket 24 and a longitudinal adjusting mechanism 3 attached to the bracket 25.

As shown in FIGS. 1 to 4, the vertical adjusting mechanism 2 is composed of a rotary rod 21 and a set of pairs of parallel links 22a and 22b, and 23a and 23b. The rotary rod 21 is arranged to extend transversely of the seat back and is rotatably supported at its one end by the bracket 24 fixed on one seat back frame 4 and at its other end by the bracket 25 fixed on the other seat back frame 5. Of all the links 22a, 22b, 23a and 23b given an equal length, the opposed links 22a and 23a are so fixed on their individual one ends to the vicinities of one and other ends of the rotary rod 21 that it may turn with the rotary rod 21. On the other hand, the opposed links 22b and 23b are individually supported turnably at their one ends by the brackets 24 and 25.

Moreover, the links 22a and 22b on the side of the one bracket 24 support a sector gear member 26 at other ends of the links 22a, 22b. The links 23a and 23b on the side of the other bracket 25 support a bracket 27 at their other ends. Here, the sector gear member 26 and the bracket 27 are opposed to each other in parallel and are individually connected at the coaxial connecting points to the links 22a, 22b, 23a and 23b.

On the bracket 24, there is supported a drive mechanism 28. This drive mechanism is equipped with a motor and a reduction gear mechanism, and its output pinion gear 28a is in meshing engagement with the toothed portion 26a of the sector gear member 26.

The longitudinal adjusting mechanism 3 is composed of a crank rod 31. This crank rod 31 is arranged to extend transversely of the seat back and is bent in a crank shape at its one and other ends. One end 31a of the crank rod 31 is inserted into and turnably supported by an arm portion 26b of the sector gear 26, and the other end 31b is retained by and connected to a sector gear member 32. This sector gear member 32 is turnably supported coaxially with one end of the crank rod 31 on the bracket 27 by a pin 33 (see FIG. 4). Around the central portion of the crank rod 31, on the other hand, there is mounted a pressure pad 35 for supporting the lumbar region of the seated person. Here, the pressure pad 35 is a support member, but may be formed into a plate shape or may be the central portion itself of the crank rod 31.

On the bracket 27, there is supported a drive mechanism 34. This drive mechanism 34 is composed of a motor and a reduction gear mechanism, and its output pinion gear 34a is in meshing engagement with the toothed portion 32a of the sector gear member 32 (see FIG. 4).

Here will be described the operation of the lumbar support device.

When the drive mechanism 34 is activated, the sector gear member 32 is turned by the meshing engagement between the output pinion gear 34a and the toothed portion 32a. By the turns of the sector gear member 32, the other end 31b of the crank rod 31 is pushed and pulled forward and backward of the seat back, and the crank rod 31 is turned on the axis joining its one end 31a and the pin 33 so that its central portion is moved forward and backward of the seat back. As a result, the force supporting the lumbar region of the seated person by the pressure pad 35 is adjusted.

When the drive mechanism 28 is activated, the sector gear member 26 will be turned by the meshing engagement between the output pinion gear 28a and the toothed portion 26a of the sector gear member 26. Since the sector gear member 26 is regulated in its turns by the links 22a and 22b, however, the sector gear member 26 is moved upward and downward of the seat back, while turning the links 22a and 22b, along the turning loci of the other ends of the links 22a and 22b. At this time, the turns of the link 22a are transmitted through the rotary rod 21 to the link 23a. As a result, the link 23a is also turned like the link 22a so that the bracket 27 is also moved upward and downward of the seat back like the sector gear 26 along the turning loci of the links 23a and 23b. By the movements of the sector gear member 76 and the bracket 27 upward and downward of the seat back, the crank rod 31 is also moved upward and downward of the seat back so that the lumbar region of the seated person by the pressure pad 35 is adjusted. At this time, since the link 22a and the link 22b, and the link 23a and the link 23b are individually in parallel, the stroke of the pressure pad 35 is always constant in the upper and lower portions.

Figure 5:
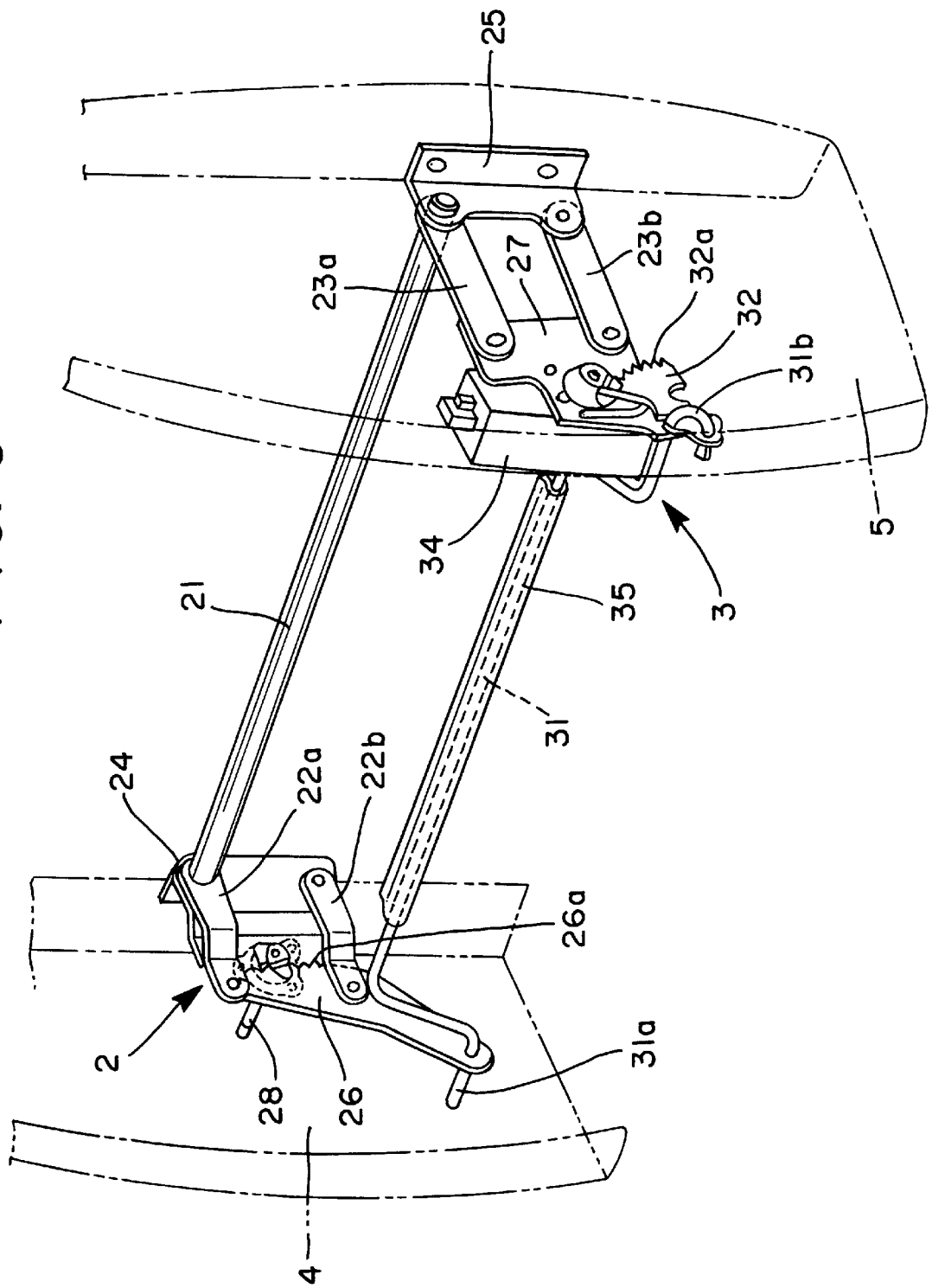
FIG. 5 is a perspective view showing a modification of a second embodiment of the lumbar support device according to the present invention.

The drive mechanism 28 may be changed from the so-called "electric type", in which the drive mechanism 28 is composed of the motor and the reduction gear mechanism, to the so-called "manual type", which is composed of a backstop mechanism such as a handle or a spring coupler, as shown in FIG. 5.

Figure 6:
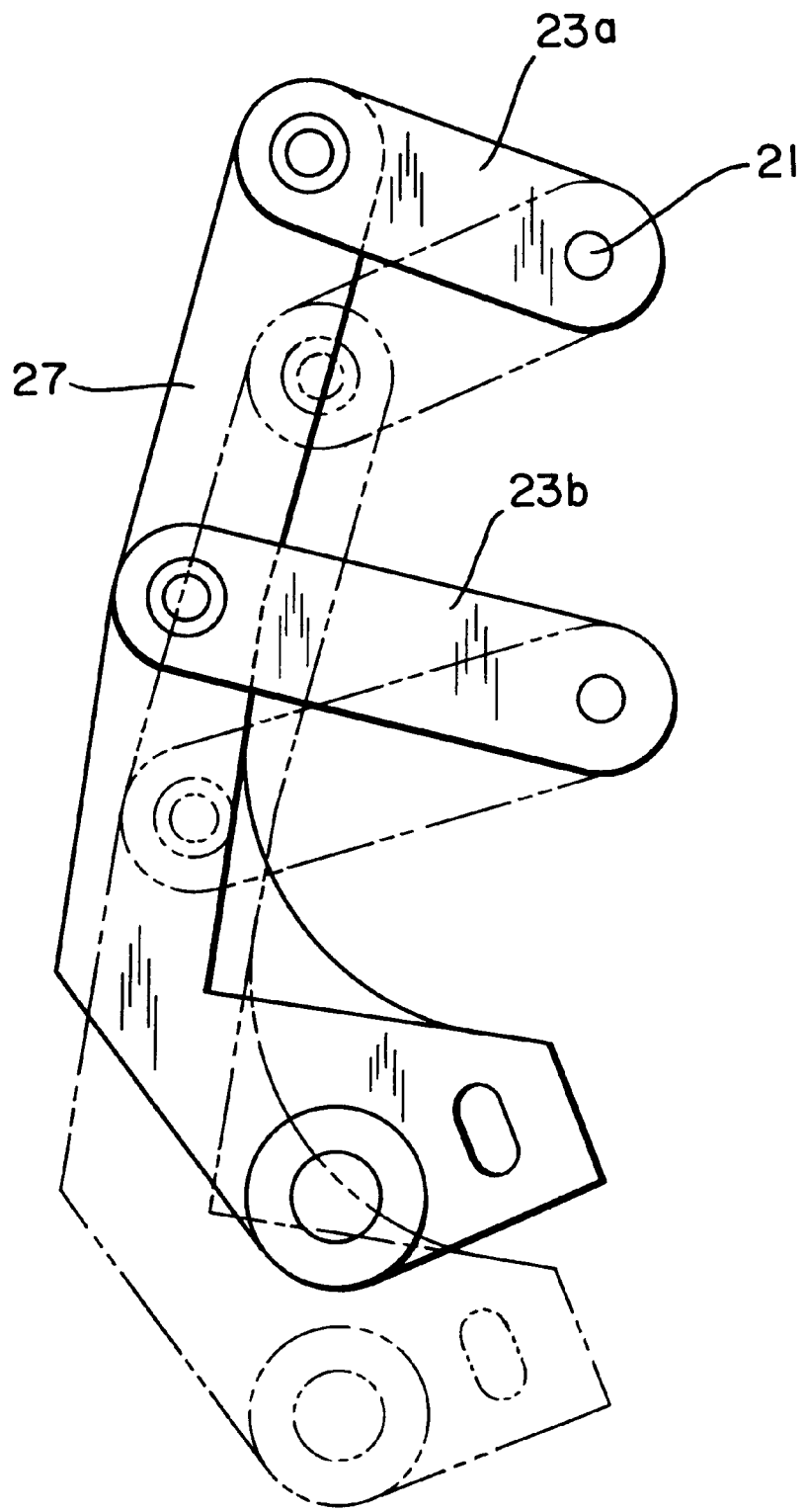
FIG. 6 is a perspective view showing a modification of a four-link mechanism of the lumbar support device according to the present invention.

The links 22b and 22c may be made longer than the links 22a and 22b, as shown in FIG. 6. Then, the moving loci of the sector gear 26 and the bracket 27 may be changed from those of the embodiment shown in FIG. 1 to linear moving loci so that the change in the supporting force at the time of adjusting the lumbar supporting position can be made arbitrary.

As many apparently widely different embodiments of the present invention can be made without departing from the spirit and scope thereof, it is to be understood that the invention is not limited to the specific embodiments thereof except as defined in the appended claims.

What is claimed is:

1. A lumbar support device comprising: movable members so supported on a seat back frame through a four-link mechanism as to move upward and downward of a seat back; and a support member so supported on said movable members through a crank rod mechanism as to move forward and backward of the seat back.

2. A lumbar support device according to claim 1, further comprising: a first drive mechanism supported on said seat back frame for activating said four-link mechanism, and a second drive mechanism supported on one of said movable members for turning said crank rod mechanism with respect to said movable members.

3. A lumbar support device comprising:
    a first bracket adapted to be secured on one portion of a seat back side frame member of a vehicle seat;
    a second bracket adapted to be secured on another portion of the seat back side frame member;
    a laterally extending rotary rod having ends that are turnably supported on the brackets;
    a pair of opposed first links each having one end fixed to an end portion of the rotary rod;
    a pair of opposed second links each having one end turnably supported on a corresponding one of the brackets;
    first drive means fixed to the first bracket;
    a first sector gear member connected to the other end of one of the first links and the other end of one of the second links and having a toothed portion which is engaged with a pinion gear of an output shaft of the first drive means;
    a movable bracket connected to the other end of the other first link and the other end of the other second link;
    second drive means fixed to the movable member;
    a second sector gear member rotatably supported on the movable bracket and having a toothed portion which is engaged with a pinion gear of an output shaft of the second drive means;
    a transversely extending crank rod rotatably supported at its ends by the first sector gear member and the second sector gear member; and
    a pressure pad secured on the crank rod;
    the first drive means being effective in moving the pressure pad in a vertical direction and the second drive means being effective in moving the pressure pad in a horizontal direction to arrange the position of the pressure pad.

4. A lumbar support device according to claim 3, wherein the crank rod has bent end portions in a crank shape at its each ends.

5. A lumbar support device according to claim 3, wherein said one portion of the seat back side frame member is a first seat back side frame and the another portion of the seat back side frame member is a second seat back side frame.

6. A lumbar support device including a pressure pad adapted to support a lumbar region of an occupant of a vehicle seat, opposed first and second sector gear members for holding each end of the pressure pad, first drive means secured to a stationary member and operatively connected to the first sector gear member, a link mechanism having four joints, and at least a second drive means which is operatively connected to the second sector gear member and secured to a movable member rotatable holding the second sector gear member, each of the first sector gear member and the movable member being one member of the link mechanism.

7. A lumbar support device according to claim 6, wherein the link mechanism is composed of a pair of stationary opposed brackets, a rotary rod rotatably supported by the opposed brackets, a pair of first opposed links secured to the rotary rod, a pair of second opposed links each having one end rotatably supported on a respective one of the opposed brackets, the first sector gear member rotatably supported on an end of one of the first links and one of the second links, and the movable member rotatably supported on an end of the other first link and an end of the other second link and having the second drive means.

* * * * *